(12) United States Patent
Nakano

(10) Patent No.: US 8,151,554 B2
(45) Date of Patent: Apr. 10, 2012

(54) EXHAUST GAS PURIFICATION SYSTEM FOR AN INTERNAL COMBUSTION ENGINE

(75) Inventor: Yasuaki Nakano, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 600 days.

(21) Appl. No.: 11/886,228

(22) PCT Filed: Mar. 20, 2006

(86) PCT No.: PCT/JP2006/306062
§ 371 (c)(1),
(2), (4) Date: Sep. 13, 2007

(87) PCT Pub. No.: WO2006/098526
PCT Pub. Date: Sep. 21, 2006

(65) Prior Publication Data
US 2008/0276597 A1    Nov. 13, 2008

(30) Foreign Application Priority Data
Mar. 18, 2005 (JP) .................................. 2005-079108

(51) Int. Cl.
*F01N 3/00* (2006.01)

(52) U.S. Cl. ................ 60/286; 60/277; 60/297; 60/301; 60/303

(58) Field of Classification Search ............... 60/276, 60/277, 285, 286, 295, 297, 301, 303
See application file for complete search history.

(56) References Cited

U.S. PATENT DOCUMENTS 5,473,890 A * 12/1995 Takeshima et al. ............ 60/285
5,771,685 A    6/1998 Hepburn et al.
5,937,638 A *  8/1999 Akazaki et al. ................ 60/274
6,185,929 B1 * 2/2001 Ishizuka et al. ................ 60/274
6,226,982 B1 * 5/2001 Poggio et al. .................. 60/276
6,345,498 B2 * 2/2002 Yonekura et al. .............. 60/277
6,615,580 B1 * 9/2003 Khair et al. .................... 60/286
6,672,052 B2 * 1/2004 Taga et al. ...................... 60/285
6,901,749 B2   6/2005 Hashimoto
6,973,775 B2 * 12/2005 Hoffmann et al. ............. 60/286

FOREIGN PATENT DOCUMENTS

| DE | 101 14 456 A1 | 10/2001 |
| DE | 100 23 060 A1 | 1/2002 |
| EP | 1 067 277 A1 | 1/2001 |
| EP | 1 270 908 A | 1/2003 |
| GB | 2 344 771 A | 6/2000 |
| JP | 08-200049 A | 8/1996 |

(Continued)

*Primary Examiner* — Binh Q Tran
(74) *Attorney, Agent, or Firm* — Kenyon & Kenyon LLP (57) ABSTRACT

An object of the present invention is to perform removal of NOx in an exhaust gas purification system for an internal combustion engine equipped with an NOx catalyst while suppressing the consumption amount of reducing agent used for NOx removal even when the NOx catalyst is deteriorated. To achieve the object, when the degree of deterioration of the NOx catalyst is lower than or equal to a specific deterioration degree, the air-fuel ratio of the exhaust gas flowing into the NOx catalyst is adjusted to the stoichiometric air-fuel ratio or a rich air-fuel ratio. On the other hand, when it is determined that the degree of deterioration of the NOx catalyst is higher than the specific deterioration degree, the air-fuel ratio of the exhaust gas flowing into the NOx catalyst is adjusted to a specific lean air-fuel ratio.

6 Claims, 4 Drawing Sheets

FOREIGN PATENT DOCUMENTS

| | | |
|---|---|---|
| JP | 2001-020781 A | 1/2001 |
| JP | 2002-115536 A | 4/2002 |
| JP | 2002-364415 A | 12/2002 |
| JP | 2003-201888 A | 7/2003 |
| JP | 2004-138033 A | 5/2004 |
| WO | WO 03/060306 A | 7/2003 |

* cited by examiner

EXHAUST GAS PURIFICATION SYSTEM FOR AN INTERNAL COMBUSTION ENGINE

This is a 371 national phase application of PCT/JP2006/306062 filed 20 Mar. 2006, claiming priority to Japanese Patent Application No. 2005-079108 filed 18 Mar. 2005, the contents of which are incorporated herein by reference.

TECHNICAL FIELD

The present invention relates to an exhaust gas purification system for purifying the exhaust gas of an internal combustion engine.

BACKGROUND ART

Technologies for removing NOx contained in the exhaust gas of an internal combustion engine by means of what is called an NOx storage reduction catalyst (which will be referred to as an "NOx catalyst" hereinafter) provided in an exhaust passage of the internal combustion engine and thereby purifying the exhaust gas have been known. However, when SOx contained in the exhaust gas is stored by the NOx catalyst to cause SOx-poisoning of the NOx catalyst, the NOx catalyst is deteriorated and the performance of removing NOx and purifying the exhaust gas is decreased.

As a solution for this, Japanese Patent Application Laid-Open No. 2001-20781 discloses a technology in which when an NOx catalyst is deteriorated for the reason of SOx-poisoning etc., a method of controlling the air-fuel ratio of the exhaust gas for removing NOx that is different from that used when the NOx catalyst is not poisoned is adopted. In this technology, when removing NOx, the air-fuel ratio of the exhaust gas is once adjusted to a predetermined rich air-fuel ratio and thereafter adjusted to an air-fuel ratio near the stoichiometric air-fuel ratio. In addition, the time over which the stoichiometric air-fuel ratio is maintained is varied depending on whether the NOx catalyst is deteriorated or not to control emission of NOx to the atmosphere.

Japanese Patent Application Laid-Open No. 2003-201888 discloses a technology of correcting a rich spike pattern taking into consideration the degree of deterioration of the catalyst.

Japanese Patent Application Laid-Open No. 2002-115536 discloses a technology concerning determination of the degree of deterioration of the catalyst based on estimation of the SOx accumulation amount.

DISCLOSURE OF THE INVENTION

In an internal combustion engine equipped with an NOx catalyst, the air-fuel ratio of the exhaust gas is made rich in order to reduce NOx stored in the NOx catalyst. By doing so, the stored NOx reacts with reducing agent (such as fuel) contained in the exhaust gas, whereby NOx is removed. However, SOx contained in the exhaust gas is also stored in the NOx catalyst together with NOx, which deteriorates the catalytic performance of the NOx catalyst.

There is less opportunity of establishment of the running condition of the internal combustion engine that facilitates removal (i.e. reduction) of the stored SOx than the opportunity of establishment of the running condition that facilitates reduction of the stored NOx. Therefore, when the NOx catalyst is in an SOx-poisoned state, even if the air-fuel ratio of the exhaust gas is made rich in the same manner as reducing and removing NOx stored by the NOx catalyst when the NOx catalyst is in the non-SOx-poisoned state, the removing function of the NOx catalyst is not exercised satisfactorily. This leads to useless consumption of the reducing agent (such as fuel). This is also the case when the NOx removing performance of the NOx catalyst is decreased due to deterioration of the NOx catalyst that is caused by a factor other than SOx.

The present invention has been made in view of the above-described problem and has as an object to provide an exhaust gas purification system for an internal combustion engine provided with an NOx catalyst (i.e. an NOx storage reduction catalyst) that can remove NOx even when the NOx catalyst is deteriorated, while controlling consumption of reducing agent (such as fuel) used for reducing NOx.

To solve the above-mentioned problem, the present invention has been made by focusing on the fact that the NOx removal characteristics of the NOx catalyst differ depending on whether the NOx catalyst is deteriorated or not. Accordingly, when the NOx catalyst is deteriorated, reducing agent is supplied in a manner corresponding to the NOx removal characteristics of the NOx catalyst that are different from those of the NOx catalyst that is not deteriorated, thereby making it possible to remove NOx efficiently while controlling consumption of reducing agent.

In view of the above, an exhaust gas purification system for an internal combustion engine according to the present invention comprises an NOx storage reduction catalyst provided in an exhaust passage of the internal combustion engine and including platinum and a storage agent, reducing agent supply means for supplying reducing agent to the exhaust gas flowing into said NOx storage reduction catalyst, deterioration determination means for determining the degree of deterioration of said NOx storage reduction catalyst, normal NOx removal means for adjusting, when it is determined by said deterioration determination means that the degree of deterioration of said NOx storage reduction catalyst is lower than or equal to a specific deterioration degree, the air-fuel ratio of the exhaust gas flowing into said NOx storage reduction catalyst to the stoichiometric air-fuel ratio or a specific rich air-fuel ratio that is richer than the stoichiometric air-fuel ratio by supplying reducing agent to the exhaust gas through said reducing agent supply means, and NOx removal means under catalyst deterioration for adjusting, when it is determined by said deterioration determination means that the degree of deterioration of said NOx storage reduction catalyst is higher than said specific deterioration degree, the air-fuel ratio of the exhaust gas flowing into said NOx storage reduction catalyst to a specific lean air-fuel ratio that is leaner than the stoichiometric air-fuel ratio by supplying reducing agent to the exhaust gas through said reducing agent supply means.

In the above-described exhaust gas purification system for an internal combustion engine, NOx contained in the exhaust gas is removed by the catalytic function of the NOx catalyst (NOx storage reduction catalyst). The NOx catalyst includes platinum and a storage agent, and NOx contained in the exhaust gas is stored in the storage agent. The catalytic performance of the NOx catalyst is not always constant, but storage of NOx by the NOx catalyst sometimes becomes insufficient for some reason such as storage of a material other than NOx in the storage agent constituting the NOx catalyst. Accordingly, the NOx catalyst is gradually deteriorated. The degree of such deterioration is determined by the deterioration determination means. Therefore, said specific deterioration degree is the threshold of the degree of deterioration for determining that NOx cannot be stored in the NOx catalyst sufficiently and the NOx catalyst is unable to exercise the catalytic function as a storage reduction catalyst satisfactorily.

When the NOx catalyst exercises the catalytic function satisfactorily, in other words, when it is determined by the deterioration determination means that the degree of deterioration of the NOx catalyst is lower than or equal to the specific deterioration degree, the NOx catalyst is able to exercise the catalytic function as a storage reduction catalyst satisfactorily. In such cases, NOx removal by the normal NOx removal means is effected. The NOx removal by the normal NOx removal means is characterized by that the air-fuel ratio of the exhaust gas is adjusted to the stoichiometric air-fuel ratio or a specific rich air-fuel ratio to cause reductive reaction of the NOx stored in the NOx catalyst and the reducing agent thereby removing NOx. Therefore, the specific rich air-fuel ratio is the air-fuel ratio of the exhaust gas that is necessary for reducing and removing the NOx stored in the NOx catalyst through reduction.

When the NOx catalyst does not exercise the catalytic function satisfactorily, in other words, when it is determined by the deterioration determination means that the degree of deterioration of the NOx catalyst is higher than the specific deterioration degree, it is difficult for the NOx catalyst to exercise the catalytic function as a storage reduction catalyst satisfactorily. Therefore, it is difficult for the NOx catalyst to store NOx contained in the exhaust gas sufficiently. In such cases, in the NOx catalyst a decrease in the storing capacity of the storage agent leads to a decrease in the basicity of the carrier thereof, and the activity of platinum is enhanced. Consequently, the NOx catalyst is deteriorated in terms of its function as a storage reduction catalyst but improved in terms of its function as a selective reduction catalyst.

In view of the above, in the above-described exhaust gas purification system for an internal combustion engine according to the present invention, attention is paid to the fact that the NOx removal characteristics of the NOx catalyst change when the NOx catalyst is deteriorate. Thus, when the NOx catalyst is deteriorated, NOx removal by the NOx removal means under catalyst deterioration is effected. In other words, NOx removal suitable for the NOx removal characteristics that have changed with deterioration of the NOx catalyst is performed. As described above, when the NOx catalyst is deteriorated, since the function of the NOx catalyst as a selective reduction catalyst is enhanced, the air-fuel ratio of the exhaust gas is adjusted to a specific lean air-fuel ratio, whereby NOx in the exhaust gas selectively reacts with the reducing agent so as to be reduced with the aid of the catalytic function of platinum and the NOx is removed from the exhaust gas.

To summarize, in the above-described exhaust gas purification system for an internal combustion engine according to the present invention, when the degree of deterioration of the NOx catalyst is low, the NOx removal by the normal NOx removal means is effected so as to cause the NOx catalyst to exercise the original catalytic function as a storage reduction catalyst. When the degree of deterioration of the NOx catalyst is high, the NOx removal by the original catalytic function as a storage reduction catalyst is temporarily suspended, and the NOx removal by the NOx removal means under catalyst deterioration is performed so as to cause the NOx catalyst to exercise the catalytic function as a selective reduction catalyst. In this way, it is possible to remove NOx contained in the exhaust gas efficiently even when the NOx catalyst is deteriorated. If the NOx removal by the normal NOx removal means is continued while the NOx catalyst is deteriorated, the reducing agent is consumed wastefully, since the reducing agent supplied through the reducing agent supply means is not sufficiently used in reducing NOx. To the contrary, in the exhaust gas purification system of the present invention, since an appropriate amount of the reducing agent suitable for the degree of deterioration of the NOx catalyst is supplied by the NOx removal means under catalyst deterioration, wasteful consumption of the reducing agent can be avoided.

In the above-described exhaust gas purification system for an internal combustion engine, said deterioration determination means may determine the degree of deterioration of said NOx storage reduction catalyst due to poisoning by SOx. In other words, NOx removal by the normal NOx removal means and NOx removal by the NOx removal means under catalyst deterioration may be selectively performed in accordance with the degree of deterioration of the NOx catalyst that is caused as SOx in the exhaust gas is increasingly stored in the storing agent of the NOx catalyst. In this case, the degree of deterioration of the NOx catalyst may be determined based on the amount of SOx stored in the NOx catalyst derived from the fuel consumption amount in the internal combustion engine etc. For example, the deterioration determination means may determine that the NOx catalyst is deteriorated, when the SOx storage amount exceeds a reference amount.

In the exhaust gas purification system for an internal combustion engine described in the foregoing, said NOx removal means under catalyst deterioration may adjust the air-fuel ratio of the exhaust gas flowing into the NOx storage reduction catalyst to said specific lean air-fuel ratio by supplying reducing agent to the exhaust gas through said reducing agent supply means when it is determined by said deterioration determination means that the degree of deterioration of said NOx storage reduction catalyst is higher than said specific deterioration degree and the temperature of said NOx storage reduction catalyst falls within a specific temperature range. In other words, the NOx removal by the NOx removal means under catalyst deterioration is effected when the NOx catalyst is in the temperature condition in which it can exercise the catalytic function as a selective reduction catalyst satisfactorily. With this feature, when the NOx catalyst is deteriorated, it is possible to remove NOx while controlling the consumption amount of the reducing agent used for the NOx removal more reliably.

The aforementioned temperature range may be from 150 to 300 degrees Celsius. It has been found base on experiments that when the temperature of the NOx catalyst falls within the range from 150 to 300 degrees Celsius, the NOx catalyst can exercise the catalytic function as a selective reduction catalyst relatively excellently. In view of this, the NOx removal by the NOx removal means under catalyst deterioration is to be effected when the catalyst temperature of the NOx catalyst falls within this temperature range and it is determined by said deterioration determination means that the NOx catalyst is deteriorated.

The above and other objects, features and advantages of the present invention will become more readily apparent to those skilled in the art from the following detailed description of preferred embodiments of the present invention taken in conjunction with the accompanying drawings.

BEST MODE FOR CARRYING OUT THE INVENTION

In the following, an Embodiment of the exhaust gas purification system for an internal combustion engine according to the present invention will be described with reference to the accompanying drawings.

Embodiment 1

Figure 1:
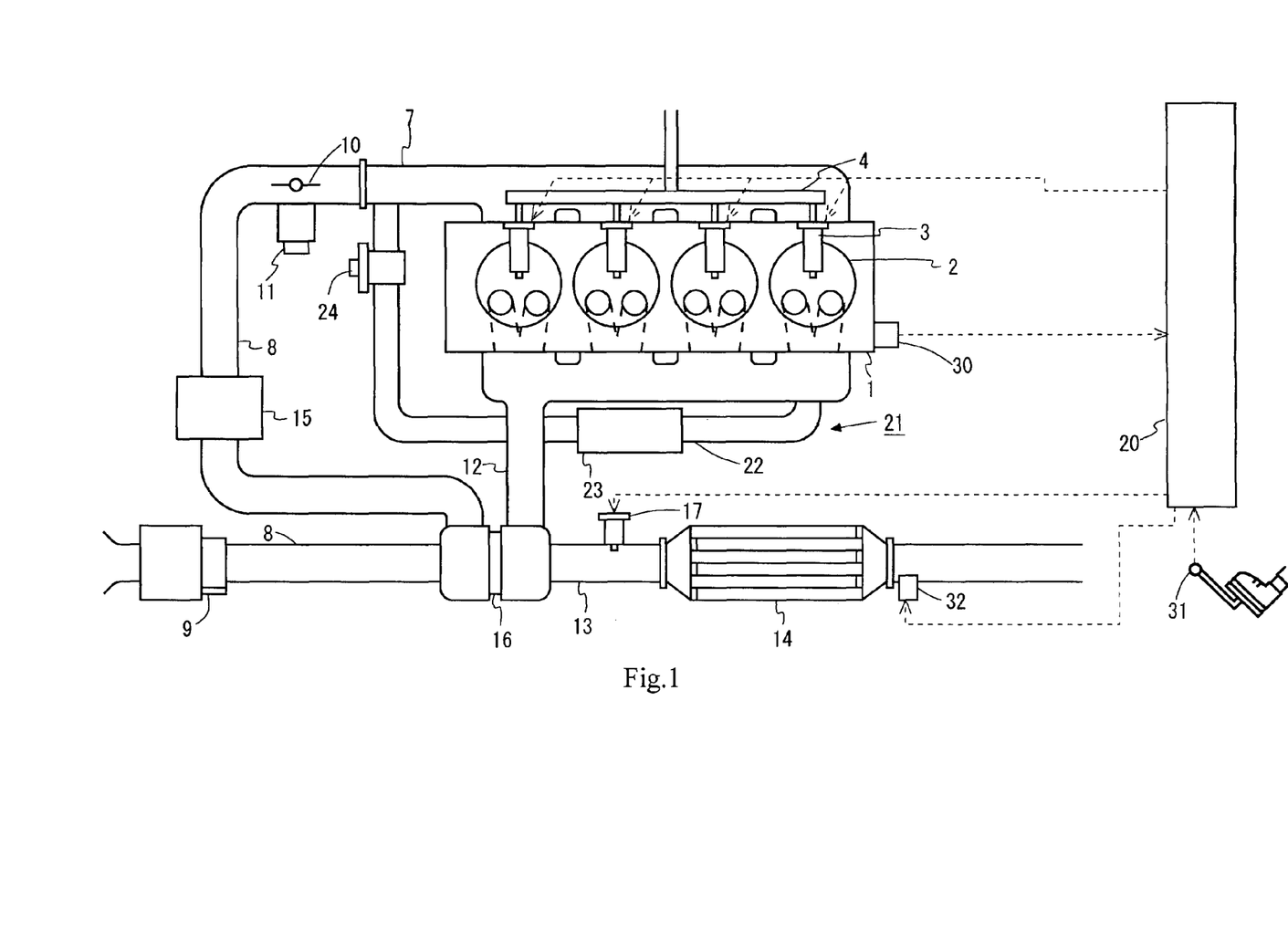
FIG. 1 schematically shows the basic configuration of an internal combustion engine and its control system to which an exhaust gas purification system for an internal combustion engine according to the present invention is applied.

FIG. 1 is a block diagram schematically showing the configuration of an internal combustion engine 1 and its control system to which the exhaust gas purification system according to the present invention is applied. The internal combustion engine 1 is a compression ignition internal combustion engine having four cylinders 2. The internal combustion engine 1 has fuel injection valves 3 for directly injecting fuel into the respective combustion chambers of the cylinders 2. Fuel injection valves 3 are connected with a pressure accumulation chamber 4 for storing fuel that is pressurized to a predetermined pressure. The internal combustion engine 1 is connected with an intake manifold 7. Branches of the intake manifold 7 are connected with the respective combustion chambers via intake ports. The internal combustion engine 1 is also connected with an exhaust manifold 12. Branches of the exhaust manifold 12 are connected with the respective combustion chambers via exhaust ports. The intake port and the exhaust port are equipped with an intake valve and an exhaust valve respectively.

The intake manifold 7 is connected with an intake pipe 8. An airflow meter 9 for detecting the quantity of intake air flowing through the intake pipe 8 is provided in the upstream portion of the intake pipe 8. In the downstream portion of the intake pipe 8, there is provided an intake throttle valve 10 for adjusting the flow rate of the intake air flowing through the intake pipe 8. To the intake throttle valve 10 is attached an intake throttle valve actuator 11 comprised of a step motor or the like that drives the intake throttle valve 10.

In the intake pipe 8 upstream of the intake throttle valve 10, there is provided a compressor part of a supercharger 16 that operates using energy of the exhaust gas as the drive source. A turbine part of the supercharger 16 is provided in the exhaust manifold 12. The supercharger 16 is a so-called variable volume turbocharger that has a movable nozzle vane in its interior. The charging pressure of the supercharger 16 is controlled by adjusting the degree of opening of the nozzle vane. At a position in the intake pipe 8 downstream of the supercharger 16 and upstream of the intake throttle valve 10, there is provided an intercooler 15 for cooling the intake air that has been pressurized by the supercharger 16 and had a high temperature. The intercooler 15 is a kind of heat exchanger, to which a cooling water is supplied for cooling. The cooling capacity of the intercooler 15 is controlled by adjusting the quantity of the cooling water supplied to the intercooler 15.

The turbine part of the supercharger 16 is connected with an exhaust pipe 13, which in turn is connected with a muffler in the downstream. In the halfway of the exhaust pipe 13, there is provided an NOx catalyst 14, which is a so-called NOx storage reduction catalyst. At a position on the exhaust pipe 13 upstream of the NOx catalyst 14, there is provided a fuel addition valve 17 for adding fuel to the exhaust gas. The NOx catalyst 14 includes platinum and storage agent (such as barium, potassium and lithium) and thereby functions as a storage reduction type catalyst normally. The catalytic function of the NOx catalyst 14 will be described later.

The internal combustion engine 1 is provided with an EGR apparatus 21. EGR apparatus 21 is adapted to recirculate a part of the exhaust gas flowing through the exhaust manifold 12 to the intake manifold 7. The EGR apparatus 21 is composed of an EGR passage 22 extending from the exhaust manifold 12 (upstream side) to the intake manifold 7 (downstream side), an EGR cooler 23 for cooling the EGR gas and an EGR valve 24 for adjusting the flow rate of the EGR gas, the EGR cooler 23 and the EGR valve 24 being provided in the EGR passage 22 in the mentioned order from upstream to downstream of the EGR passage 22.

To the internal combustion engine 1 is annexed an electronic control unit 20 (which will be hereinafter referred to as the "ECU") that controls the internal combustion engine 1. The ECU 20 includes a ROM, RAM or the like that stores various programs and maps that will be described later in addition to a CPU. The ECU 20 is a unit that controls the running conditions of the internal combustion engine 1 in accordance with running requirements of the internal combustion engine 1 and driver's demands.

The fuel injection valve 3 is opened/closed by a control signal from the ECU 20. More specifically, the timing and the quantity of fuel injection through each fuel injection valve 3 are controlled by a command from the ECU 20 in accordance with running conditions of the internal combustion engine 1 such as the engine load and the engine rotation speed. The fuel addition valve 17 is also controlled by a command from the ECU 20.

Furthermore, an accelerator pedal position sensor 31 is electrically connected with the ECU 20, and the ECU 20 receives a signal indicative of the accelerator pedal position from the accelerator pedal position sensor 31 and computes an engine load required for the internal combustion engine 1 etc. based on that signal. A crank position sensor 30 is also electrically connected with the ECU 20, and the ECU 20 receives a signal indicative of the rotational angle of the output shaft of the internal combustion engine 1 from the crank position sensor 30 and detects the rotation speed of the internal combustion engine 1 and the piston position in each of the cylinders 2 etc. In addition, a temperature sensor 32 for detecting the temperature of the exhaust gas flowing out of the NOx catalyst 14 is provided in the exhaust pipe 13 downstream of the NOx catalyst 14. The temperature sensor 32 is also electrically connected with the ECU 20.

In the internal combustion engine 1 having the above described configuration, purification of the exhaust gas is performed mainly by the NOx catalyst 14. Normally, when the NOx catalyst 14 is not deteriorated, in other words, when the NOx catalyst 14 is in a state capable of functioning as a so-called storage reduction catalyst, NOx contained in the exhaust gas is stored into the NOx catalyst 14 when the air-fuel ratio of the exhaust gas is in a lean condition. On the other hand, when the air-fuel ratio of the exhaust gas is in a rich condition and reducing agent (i.e. fuel added through the fuel addition valve 17) is present, the NOx catalyst 14 functions to reduce and remove the stored NOx. However, as the use of the NOx catalyst 14 continues, deterioration of the storage agent that constitutes the NOx catalyst 14 progresses, and it sometimes becomes difficult for the NOx catalyst 14 to exercise the function of a storage reduction catalyst satisfactorily. An example of such deterioration of the NOx catalyst 14 is a decrease in the NOx storage capacity of the NOx catalyst 14 caused by storage of SOx contained in the exhaust gas into the storage agent.

Figure 2:
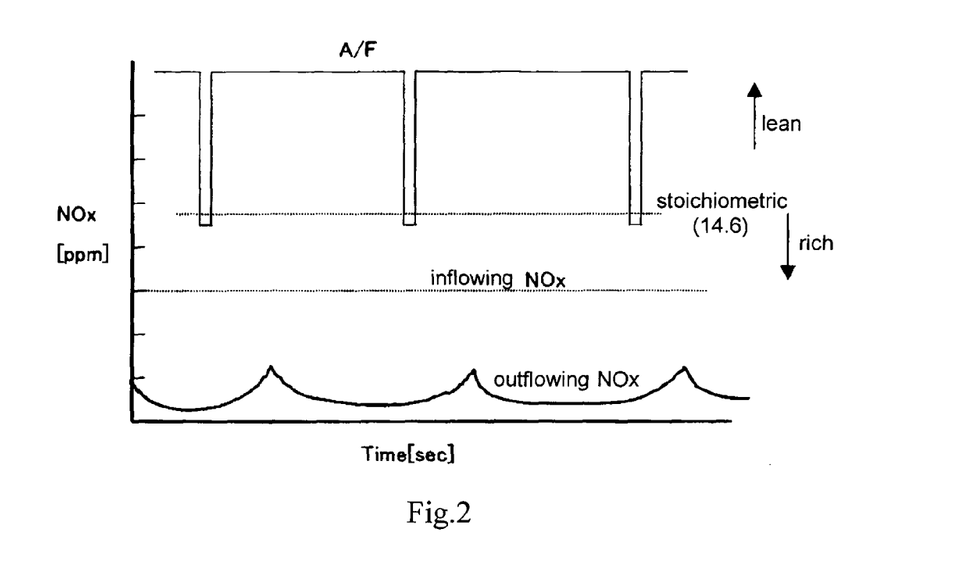
FIG. 2 is a graph showing changes in the air-fuel ratio of the exhaust gas and the NOx concentration in the exhaust gas when NOx removal (normal NOx removal) is performed by the NOx catalyst of the exhaust gas purification system for an internal combustion engine according to the embodiment of the present invention.

Here, removal of NOx by the NOx catalyst 14 will be described in the following with reference to FIGS. 2 and 3. FIG. 2 shows how NOx is removed in the case where the NOx catalyst 14 is not deteriorated, namely where the NOx catalyst 14 is in a state capable of functioning as a so-called storage reduction catalyst. In FIG. 2, the upper part indicates changes in the air-fuel ratio of the exhaust gas flowing into the NOx catalyst 14, the middle part indicates the NOx concentration in the exhaust gas flowing into the NOx catalyst 14, and the lower part indicates the NOx concentration in the exhaust gas flowing out of the NOx catalyst 14. As will be seen from FIG. 2, when the NOx catalyst 14 is nearly saturated by continuous storage of NOx, the air-fuel ratio of the exhaust gas is adjusted from a stoichiometric air-fuel ratio to a richer air-fuel ratio. This is achieved by adding fuel to the exhaust gas through the fuel addition valve 17. As a result, the NOx stored in the NOx catalyst 14 is reduced and removed, and storage of NOx contained in the exhaust gas into the NOx catalyst is restarted. In this way, by adding fuel through the fuel addition valve 17 to thereby adjust the air-fuel ratio of the exhaust gas flowing into the NOx catalyst 14 to a specific rich air-fuel ratio at regular intervals, the NOx catalyst 14 can exercise the function as a storage reduction catalyst. Accordingly, the fuel addition valve 17 constitutes the reducing agent supply means.

As described before, however, the NOx catalyst 14 also stores SOx contained in the exhaust gas. As a result, the catalytic function of the NOx catalyst 14 as a storage reduction catalyst is deteriorated. Furthermore, SOx stored in the NOx catalyst 14 stays in the NOx catalyst 14 relatively stably by its nature, since it forms a sulfate with the storage agent. For this reason, it is difficult to remove the stored SOx out of the NOx catalyst 14 by the above mentioned way of reducing and removing NOx. To remove the SOx, other conditions such as a further increase in the temperature of the NOx catalyst 14 than in NOx removal are required to be established. Accordingly, there is less opportunity of removing the stored SOx from the NOx catalyst to recover the NOx catalyst 14 from deterioration than the opportunity of reducing and removing the NOx stored in the NOx catalyst. Therefore, it is sometimes inevitable to perform removal of NOx by the NOx catalyst 14 in the state in which its catalytic function as a storage reduction catalyst is deteriorated.

In such states, if the air-fuel ratio of the exhaust gas flowing into the NOx catalyst 14 is changed to the predetermined rich air-fuel ratio as shown in FIG. 2, reductive reaction of the fuel as reducing agent added through the fuel addition valve 17 with NOx does not occur sufficiently since the NOx catalyst is deteriorated, and the fuel may be emitted directly to the atmosphere. This leads to worsening of the emission and wasteful consumption of fuel. In view of this, in such cases, the NOx removal shown in FIG. 3 is performed.

Figure 3:
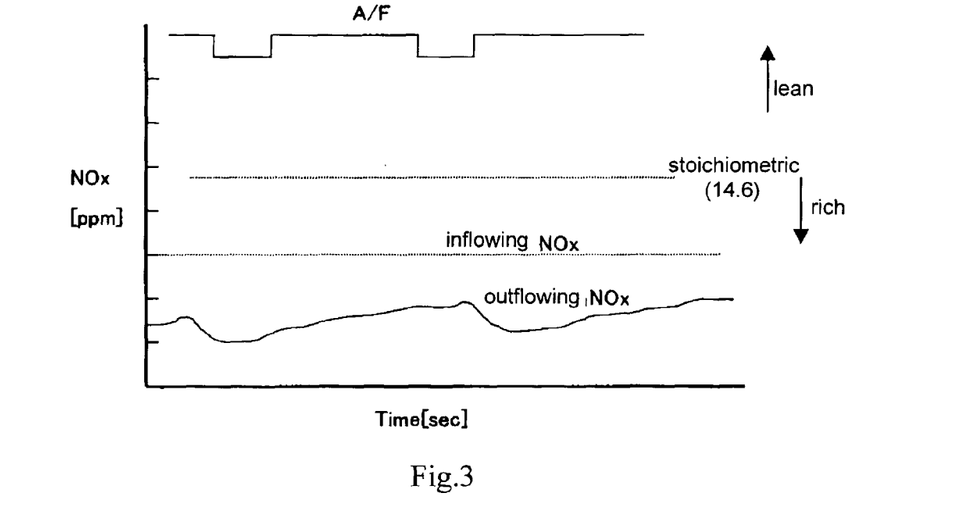
FIG. 3 is a graph showing changes in the air-fuel ratio of the exhaust gas and the NOx concentration in the exhaust gas when NOx removal (NOx removal under catalyst deterioration) is performed by the NOx catalyst of the exhaust gas purification system for an internal combustion engine according to the embodiment of the present invention.

In FIG. 3, the upper part indicates changes in the air-fuel ratio of the exhaust gas flowing into the NOx catalyst 14, the middle part indicates the NOx concentration in the exhaust gas flowing into the NOx catalyst 14, and the lower part indicates the NOx concentration in the exhaust gas flowing out of the NOx catalyst 14. When SOx is stored in the NOx catalyst 14 to cause deterioration of the catalyst, the basicity of the carrier of the NOx catalyst 14 decreases, and the intrinsic activity of platinum that constitutes the NOx catalyst 14 is enhanced accordingly. In view of this, when the NOx catalyst 14 is deteriorated, NOx removal making use of the activity of platinum is performed. Specifically, as shown in FIG. 3, addition of fuel to the exhaust gas through the fuel addition valve 17 is effected at regular intervals, and the air-fuel ratio of the exhaust gas at that time is controlled to a specific lean air-fuel ratio that is leaner than the stoichiometric air-fuel ratio. In other words, the NOx catalyst 14 is caused to function not as an originally-intended storage reduction catalyst but as a so-called selective reduction catalyst to remove NOx.

As will be understood by comparing FIG. 2 and FIG. 3, when the NOx catalyst 14 is deteriorated and the NOx catalyst 14 is made to function as a selective reduction catalyst, the NOx removal ratio (that is, the ratio of the difference between the quantity of NOx contained in the exhaust gas flowing into the NOx catalyst and the quantity of NOx contained in the exhaust gas flowing out of the NOx catalyst to the quantity of NOx contained in the exhaust gas flowing into the NOx catalyst) decreases a little as compared to the case where the NOx catalyst 14 is not deteriorated and the NOx catalyst 14 is made to function as a storage reduction catalyst. However, when the NOx catalyst 14 is deteriorated, the NOx removal ratio is higher in the case where the NOx catalyst 14 is made to function as a selective reduction catalyst than in the case where it is made to function as a storage reduction catalyst. Therefore, when the NOx catalyst 14 is deteriorated, it is possible to control worsening of the emission caused by fuel contained in the exhaust gas and wasteful consumption of fuel by causing the NOx catalyst 14 to function as a selective reduction catalyst.

Figure 4:
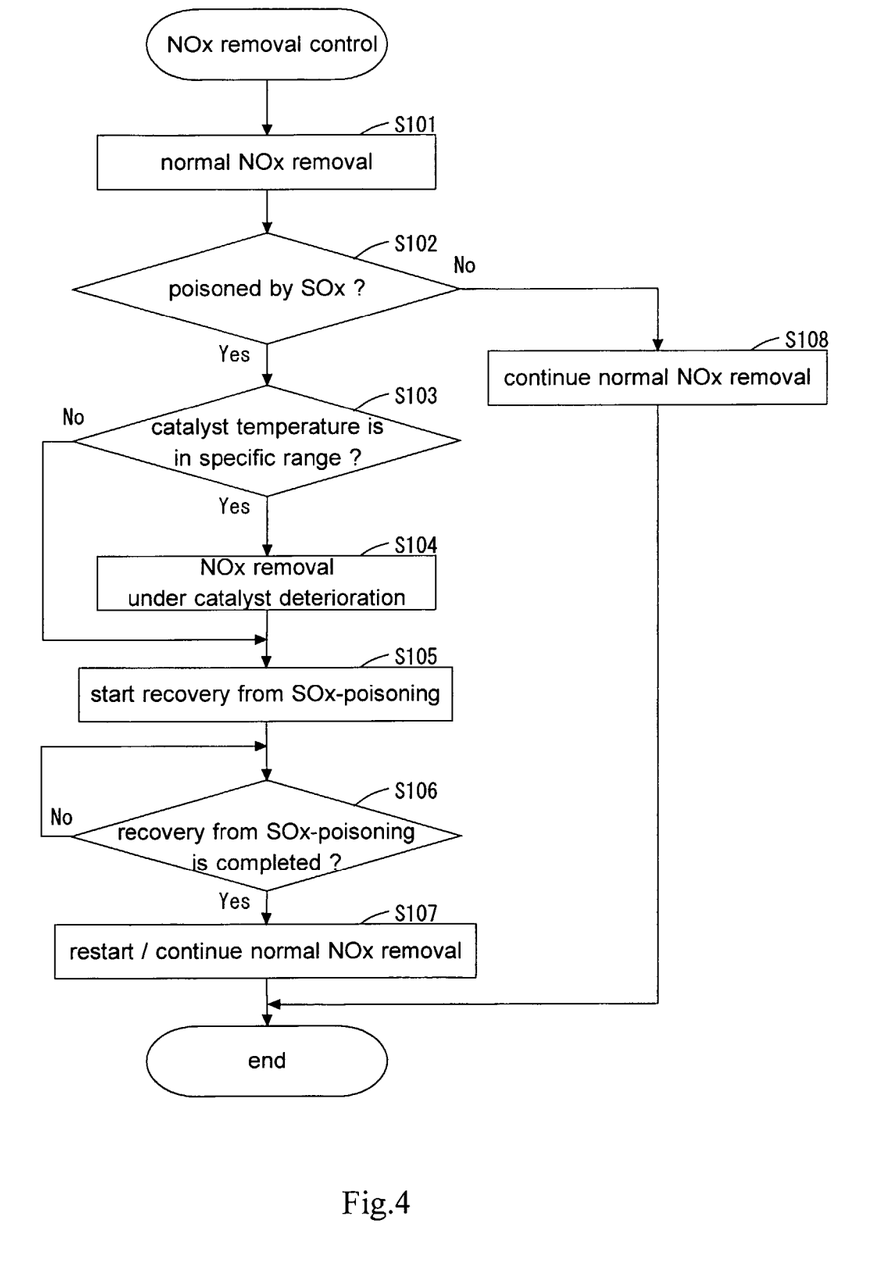
FIG. 4 is a flow chart of an NOx removal control process performed in the exhaust gas purification system for an internal combustion engine according to the embodiment of the present invention.

In the light of the above-described NOx removal by means of the NOx catalyst 14, an NOx removal control process performed in the internal combustion engine 1 will be described with reference to FIG. 4. The NOx removal control in this embodiment is a routine that is executed by the ECU 20 at regular intervals while the internal combustion engine 1 is running. In this embodiment, accordingly, the ECU 20 as such constitutes the deterioration determination means, the normal NOx removal means and the NOx removal means under catalyst deterioration.

In step S101, in the state where the NOx is not deteriorated, normal NOx removal is performed where the NOx catalyst 14 functions as a storage reduction catalyst. Specifically, the air-fuel ratio of the exhaust gas flowing into the NOx catalyst 14 is adjusted to a specific rich air-fuel ratio by adding fuel to the exhaust gas through the fuel addition valve 17 as shown in FIG. 2, thereby removing the NOx stored in the NOx catalyst 14 through reduction. After completion of step S101, the process proceeds to step S102.

In step S102, a determination is made as to whether the NOx catalyst 14 is in an SOx-poisoned state or not. In other words, a determination is made as to whether or not SOx in the exhaust gas stored into the NOx catalyst 14 has rendered the NOx catalyst 14 difficult to function as a storage reduction catalyst satisfactorily. More specifically, an estimation of the amount of SOx stored in the NOx catalyst 14 is made based on the integrated amount of the fuel injected through the fuel injection valve 3 for fuel combustion in the internal combustion engine 1. When the estimated SOx amount is larger than a reference value, it is determined that a relatively large amount of SOx is stored in the storage agent of the NOx catalyst 14 such that the NOx catalyst 14 is rendered incapable of functioning as a storage reduction catalyst satisfactorily. In other words, it is determined that the NOx catalyst 14 is deteriorated. If it is determined that the NOx catalyst 14 is in an SOx-poisoned state, namely if it is determined that the NOx catalyst 14 is deteriorated, the process proceeds to step S103. On the other hand, if it is determined that the NOx catalyst 14 is not in an SOx-poisoned state, namely if it is determined that the NOx catalyst 14 is not deteriorated, the process proceeds to step S108.

Figure 5:
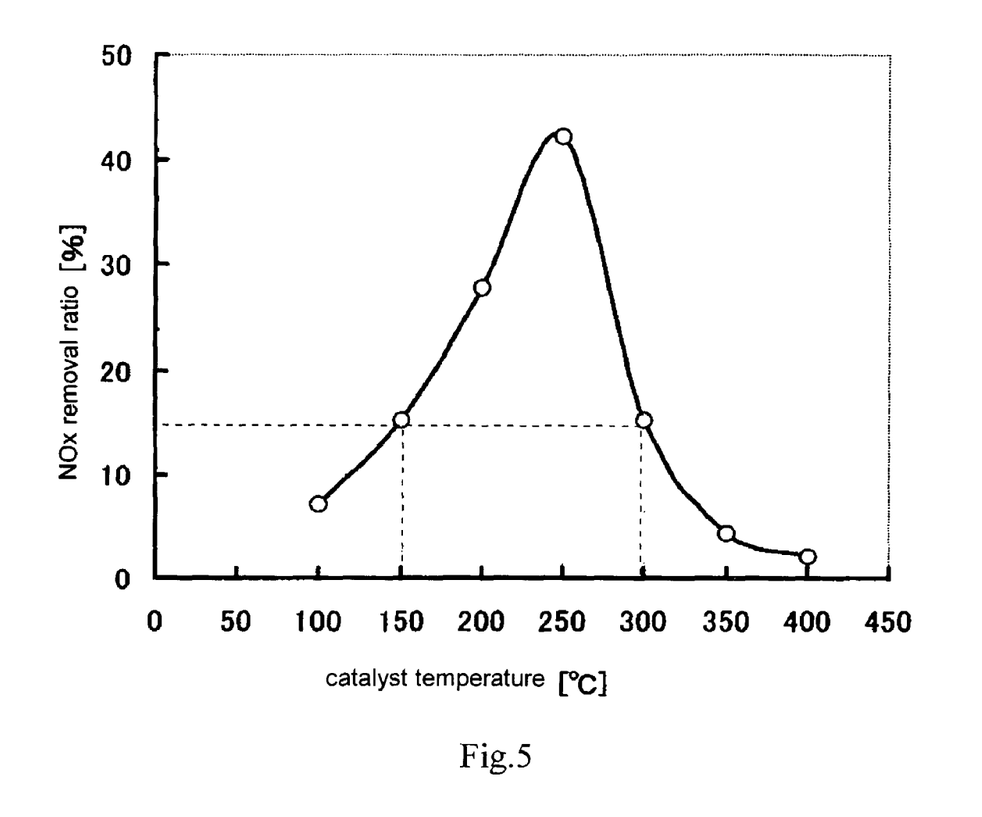
FIG. 5 is a graph showing the relationship between the catalyst temperature and the NOx removal ratio while the catalyst exercises the catalytic function as a selective reduction catalyst, in the NOx catalyst in the exhaust gas purification system for an internal combustion engine according to the embodiment of the present invention.

In step S103, a determination is made as to whether or not the catalyst temperature of the NOx catalyst 14 falls within a predetermined temperature range. As described above, when the NOx catalyst 14 is deteriorated, the NOx removal ratio becomes higher in the case where the NOx catalyst 14 is made to function as a selective reduction catalyst than in the case where it is made to function as a storage reduction catalyst. The NOx removal ratio associated with the NOx catalyst 14 functioning as a selective reduction catalyst changes with the catalyst temperature as shown in FIG. 5. FIG. 5 shows the relationship between the catalyst temperature of the NOx catalyst 14 used in this embodiment and the NOx removal ratio associated with its function as a selective reduction catalyst. As will be seen from this graph, with the NOx catalyst 14, the NOx removal ratio becomes maximum at a catalyst temperature of approximately 250 degrees Celsius, and the NOx removal ratio decreases as the temperature falls or rises away from 250 degrees Celsius.

In this embodiment, NOx removal by means of the NOx catalyst 14 functioning as a selective reduction catalyst is performed when NOx removal ratios equal to or higher than 15% can be achieved. Thus, the above-mentioned predetermined temperature range should be from 150 to 300 degrees Celsius. In connection with this, the catalyst temperature of the NOx catalyst 14 is estimated based on the exhaust gas temperature measured by the exhaust gas temperature sensor 32. When the catalyst temperature of the NOx catalyst 14 falls within the predetermined temperature range, namely when the NOx catalyst 14 can exercise the function as a selective reduction catalyst, the process proceeds to step S104. On the other hand, when the catalyst temperature of the NOx catalyst 14 does not fall within the predetermined temperature range, namely when the NOx catalyst 14 cannot exercise the function as a selective reduction catalyst, the process proceeds to step S105.

In step S104, NOx removal under catalyst deterioration is performed where the NOx catalyst 14 in a deteriorated state functions as a selective reduction catalyst. Specifically, the air-fuel ratio of the exhaust gas flowing into the NOx catalyst 14 is adjusted to a specific lean air-fuel ratio by adding fuel to the exhaust gas through the fuel addition valve 17 as shown in FIG. 3, and thereby the NOx contained in the exhaust gas is removed utilizing the selective reduction function of the NOx catalyst 14. After completion of step S104, the process proceeds to step S105.

In step S105, recovery of the NOx catalyst 14 from an SOx-poisoned state is performed, when a predetermined condition is established. To recover the NOx catalyst from an SOx-poisoned state, it is necessary that the catalyst temperature of the NOx catalyst 14 is relatively high and the air-fuel ratio of the exhaust gas flowing into the NOx catalyst 14 is rich. In order to control the flow rate of the exhaust gas, recovery of the NOx catalyst 14 from an SOx-poisoned state may be performed while the running condition of the internal combustion engine 1 that is determined by the engine load and the engine revolution speed falls within the low load range. After completion of step S105, the process proceeds to step S106.

In step S106, a determination is made as to whether or not the recovery of the NOx catalyst 14 from the SOx-poisoned state started in step S105 has been completed. In other words, a determination is made as to whether or not the NOx catalyst 14 has recovered from the deteriorated state and is capable of functioning as a storage reduction catalyst satisfactorily. If it is determined that the recovery of the NOx catalyst 14 from the SOx-poisoned state has been completed, the process proceeds to step S107. If it is determined that the recovery of the NOx catalyst 14 from the SOx-poisoned state has not been completed, the process of step S106 is performed again.

In step S107, in the case where the NOx removal under catalyst deterioration has been performed in the NOx catalyst 14 in accordance with step S104, the normal NOx removal of step S101 is restarted upon recovery of the NOx catalyst 14 from the SOx-poisoned state. Specifically, when the NOx catalyst 14 recovers from the deteriorated state, NOx removal is performed by the NOx catalyst 14 exercising not the function as a selective reduction catalyst but the function of a storage reduction catalyst. On the other hand, in the case where the NOx removal under catalyst deterioration in accordance with step S104 has not been performed in the NOx catalyst 14, the normal NOx removal is continued. After completion of step S107, this control routine is terminated.

In step S108, since the NOx catalyst 14 has not been deteriorated by SOx yet as determined in step S102, the normal NOx removal in accordance with step S101 is continued. After completion of step S108, this control routine is terminated.

According to this control, when the NOx catalyst 14 is not deteriorated, the NOx catalyst 14 removes the NOx by exercising the catalytic function as a storage reduction catalyst. However, when it is determined that the NOx catalyst 14 is deteriorated, it is difficult to remove NOx satisfactorily by utilizing the catalytic function as a storage reduction catalyst, which results in worsening of the emission and an increase in the fuel consumption. In view of this, the catalytic function of the NOx catalyst 14 as a selective reduction catalyst is utilized. This makes it possible to remove NOx efficiently and prevent worsening of the emission and an increase in the fuel consumption. In other words, according to this control, when the NOx catalyst 14 is deteriorated, it is possible to control adverse effects associated with the catalyst deterioration such as a decrease in the NOx removal ratio by temporarily changing the NOx removal method from the normal NOx removal to the NOx removal under catalyst deterioration.

In this control, the reducing agent (such as fuel) is supplied to the NOx catalyst 14 through the fuel addition valve 17. Alternatively, the reducing agent may be supplied to the NOx catalyst 14 by adjusting the quantity of unburned fuel contained in the exhaust gas by adjusting the fuel injection quantity, the fuel injection timing and/or the number of time of fuel injection through the fuel injection valve 3.

While the invention has been described in terms of preferred embodiments, those skilled in the art will recognize that the invention can be practiced with modifications within the spirit and scope of the appended claims.

INDUSTRIAL APPLICABILITY

In an exhaust gas purification system for an internal combustion engine equipped with an NOx catalyst (NOx storage reduction catalyst), it is possible to achieve removal of NOx even when the NOx catalyst is deteriorated, while suppressing an increase in the consumption of reducing agent (such as fuel) used for reducing NOx.

The invention claimed is:

1. An exhaust gas purification system for an internal combustion engine comprising:
    an NOx storage reduction catalyst provided in an exhaust passage of the internal combustion engine and including platinum and a storage agent;
    a fuel injection valve for injecting fuel for combustion directly into a combustion chamber of said internal combustion engine based on the timing and the quantity of fuel injection controlled in accordance with running conditions of said internal combustion engine;
    a fuel addition valve provided in said exhaust passage upstream of said NOx storage reduction catalyst for supplying fuel addition to the exhaust gas flowing into said exhaust passage;
    deterioration determination means for determining the degree of deterioration of said NOx storage reduction catalyst;
    normal NOx removal means for adjusting, when it is determined by said deterioration determination means that the degree of deterioration of said NOx storage reduction catalyst is lower than or equal to a specific deterioration degree, the air-fuel ratio of the exhaust gas flowing into said NOx storage reduction catalyst to the stoichiometric air-fuel ratio or a specific rich air-fuel ratio that is richer than the stoichiometric air-fuel ratio by injecting fuel for combustion by said fuel injection valve and supplying fuel to the exhaust gas through said fuel addition valve; and
    NOx removal means under catalyst deterioration for adjusting, when it is determined by said deterioration determination means that the degree of deterioration of said NOx storage reduction catalyst is higher than said specific deterioration degree, with the Nox removal by the normal NOx removal means being temporarily suspended, the air-fuel ratio of the exhaust gas flowing into said NOx storage reduction catalyst to a specific lean air-fuel ratio that is leaner than the stoichiometric air-fuel ratio by injecting fuel for combustion by said fuel injection valve and supplying fuel to the exhaust gas through said fuel addition valve, so that NOx in the exhaust gas can be reduced by said NOx storage reduction catalyst.

2. An exhaust gas purification system for an internal combustion engine according to claim 1, wherein said deterioration determination means determines the degree of deterioration of said NOx storage reduction catalyst caused by SOx-poisoning.

3. An exhaust gas purification system for an internal combustion engine according to claim 1, wherein said NOx removal means under catalyst deterioration is adapted to adjust the air-fuel ratio of the exhaust gas flowing into the NOx storage reduction catalyst to said specific lean air-fuel ratio by said fuel injection valve and supplying fuel to the exhaust gas through said fuel addition valve when it is determined by said deterioration determination means that the degree of deterioration of said NOx storage reduction catalyst is higher than said specific deterioration degree and the temperature of said NOx storage reduction catalyst falls within a specific temperature range.

4. An exhaust gas purification system for an internal combustion engine according to claim 3, wherein said specific temperature range is from 150 to 300 degrees Celsius.

5. An exhaust gas purification system for an internal combustion engine according to claim 2, wherein said NOx removal means under catalyst deterioration is adapted to adjust the air-fuel ratio of the exhaust gas flowing into the NOx storage reduction catalyst to said specific lean air-fuel ratio by said fuel injection valve and supplying fuel to the exhaust gas through said fuel addition valve when it is determined by said deterioration determination means that the degree of deterioration of said NOx storage reduction catalyst is higher than said specific deterioration degree and the temperature of said NOx storage reduction catalyst falls within a specific temperature range.

6. An exhaust gas purification system for an internal combustion engine according to claim 5, wherein said specific temperature range is from 150 to 300 degrees Celsius.

* * * * *